July 4, 1961  J. B. HAYNES ET AL  2,991,445

ECHO RANGING SYSTEM

Filed June 14, 1955  6 Sheets-Sheet 1

INVENTORS.
James Burney Haynes,
BY Charles H Lanphier,
Brown, Jackson, Boettcher & Dienner
ATTYS.

United States Patent Office 2,991,445
Patented July 4, 1961

2,991,445
ECHO RANGING SYSTEM
James Burney Haynes and Charles H. Lanphier, Springfield, Ill., assignors, by mesne assignments, to Sangamo Electric Company, Springfield, Ill., a corporation of Delaware
Filed June 14, 1955, Ser. No. 515,323
15 Claims. (Cl. 340—1)

The present invention relates to underwater echo ranging systems and more particularly to a novel and improved indicating system employed therein which achieves more accurate measurement of a target bearing and range than hitherto achieved.

Conventional echo ranging systems for determining the location of underwater objects with respect to a given vessel operate by transmitting a pulse of energy at an audio or a supersonic frequency and measuring the elapsed time between the instant of transmission and the instant of reception of a signal reflected from the surface of the unknown object. In one system the position of the unknown object is displayed on the viewing surface of a cathode ray tube or indicator device as a brightened spot whose position relative to a zero reference position is indicative of its range and bearing from the vessel. The indicator device has a linearly timed spiral sweep such that the distance of the beam from the center of the cathode ray tube as depicted thereon is a linear function of the elapsed time since the initiation of the transmitted pulse, and hence is proportional to the range of the reflecting object. An accurate measurement of the distance and angular position of the spiral beam from the center of the cathode ray tube and hence the distance and bearing of the target from the vessel is determined by means of a line or cursor whose angular position and length on the face of the indicator device may be varied by means of handwheels which actuate appropriate dials calibrated in terms of bearing and range to the target. The spiral sweep and the cursor displays are presented alternately on the viewing surface. However, because the time interval between such alternate presentations is of extremely short duration, and because the viewing surface has a high persistence, the sweep and cursor displays appear to provide a single presentation. Thus the cursor may readily be positioned so that one extremity thereof coincides with the brightened spot representative of target position.

For commercial navigation and military offensive and defensive tactics against undersea craft the accurate determination of the bearing and range of an unknown object becomes of utmost importance. Extensive efforts have been made to increase the accuracy of these measurements and have been to some degree successful. However, the seriousness and importance of this problem require yet more effective and improved range and bearing indicator circuits. The accuracy of prior art indicating devices is limited by the length of the sweep available and rapidly decreases as the range to the target is extended.

Further in prior art echo ranging systems the target point appears at a position remote from the center of the indicator device resulting in a phychological factor which reduces the ability of the operator to concentrate on the target in the same manner as when the target point appears at the center of the indicator device.

In prior art radio ranging systems efforts have been made to offset the point of origin of the sweep to achieve a presentation in which the target point is centered on the viewing screen. The approach used heretofore has involved two coils one of which carries the sweep currents and the other carries currents which provide an offsetting feature. Since it is difficult to adequately balance out the effect of the sweep currents by an induced current because of variations in the physical structure of the coils, serious problems have arisen which render an offset presentation by the use of separate sets of coils impracticable and impair the accuracy of the range and bearing measurements. Sonar systems which employ an offset sweep have not been successfully produced heretofore.

It is an object of the present invention to provide a new and novel range and bearing indicating system which affords a greater accuracy in determining target position than that hitherto available.

It is another object of the present invention to provide a new and novel indicating system in which the target point is capable of being displayed substantially at the center of the indicator device.

It is yet another object of the present invention to provide a novel indicating system in which the sweep length is effectively expanded or amplified without increasing the size of the indicator device by offsetting the originating point of the sweep.

It is yet another object of the present invention to provide a novel indicator device in which a single coil is used to carry both the sweep current and the offset producing current to increase the accuracy of the range and bearing measurements.

Our improved system results in the following two prominent advantages or features:

(1) The target indication remains relatively stationary on the viewing surface of the cathode ray tube, regardless of relative ship and target motions, rather than moving around on the viewing surface. In this connection, while our improved apparatus enables the target indication to be centered exactly in the viewing scope, such exact centering is not essential, but can be located off-center, if desired. It will be understood that only one target can be centered at any one time.

(2) The large amplification or expansion of the spiral sweep greatly increases the accuracy of determining the target position. For example, we preferably construct our apparatus to amplify the spiral sweep approximately 2½ diameters, which is comparable to the improved tracking achieved by an optical system of 6¼ power, compared to that obtained with no magnification. It will be understood that the spiral sweep and the cursor pattern do not produce the same target spot; the target spot is actually produced by the automatic increase occurring in the cathode ray beam current at the echo point in the spiral sweep; following which the coordinates of said target spot are measured by superimposing the target end of the cursor line on the target spot after it has been thus produced on the viewing screen. It will also be understood that in the "target center display" mode of operation of our improved apparatus, because of the offset location of the center or point of origin of the sweep, and because of the amplification factor of the sweep diameter, the center of sweep is not displayed on the viewing screen; nor is the base end of the cursor line, emanating substantially from the center of sweep, ordinarily displayed on the viewing screen.

These and further objects, features and advantages of this invention will be recognized by those familiar with the art from the following description of a preferred embodiment thereof, as illustrated in the accompanying drawings in the several figures of which like reference numerals indicate like elements, and in which.

*General description*

The basic operation of the sonar system of which the present invention is an improvement is conventional in that a pulse of energy at a sonic frequency is transmitted radially in all directions throughout the water surrounding a transmitter. Sound waves are reflected from objects in the path of the originating sound wave and are received by a transducer which may be the same as the transmitting transducer. In one system the transmitting and receiving transducer comprises a plurality of magneto-strictive elements which are spaced in the form of staves around a common center and are arranged to convert an electrical pulse into a sound wave for transmission, and a received sound wave into an electrical impulse for reception of an echo from a reflecting object. In its receiving condition a scanning system selects certain of the magneto-strictive elements to create impulses which are introduced into a receiver or amplifying system for presentation on the viewing surface of an indicating device, thus achieving a highly selective directional characteristic for the system.

Figures 1, 1A, 1B, 2:
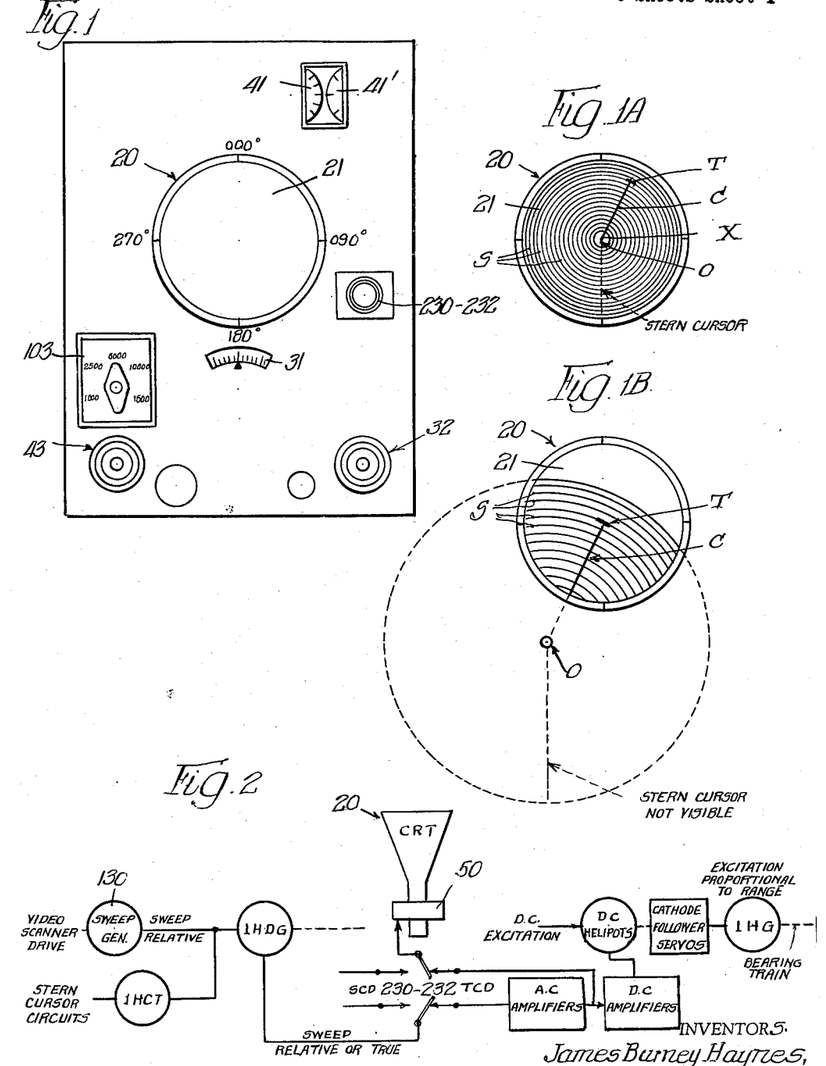
FIGURE 1 is an elevational view, somewhat diagrammatic in detail, showing part of the control-indicator cabinet embodying our echo ranging system.
FIGURE 1A is a diagrammatic view of the cathode ray viewing screen operating under conditions to produce a "ship center display" type of presentation.
FIGURE 1B is another diagrammatic view of the cathode ray viewing screen operating under conditions to produce a "target center display" type of presentation.
FIGURE 2 is an outline circuit diagram of the main controls acting on the cathode ray indicator tube.

FIGURE 1 shows such viewing surface of an indicating device, this preferably consisting of the viewing screen 21 of a cathode ray tube 20.

Control circuits are provided which constitute an integral part of the sonar system and correlate the transmission of the pulse, develop signals which control the beam deflection of the indicator device or cathode ray tube 20 and brighten the screen 21 of the cathode ray tube to simulate the position of the received echoes with respect to the vessel employing the sonar system.

In displaying the target information on the screen 21 of a cathode ray tube, there are two types of presentation which may be alternatively employed. One of these is designated ship center display (S.C.D.) as shown in FIGURE 1A, and the other target center display (T.C.D.) as shown in FIGURE 1B.

In the first of these two types of presentation, namely, ship center display, which is conventional in the art, the cathode ray tube beam begins an expanding spiral sweep S at the center of the cathode ray tube screen 21, as shown in FIGURE 1A. The initiation of the sweep corresponds with the transmission of a pulse of sound energy from the transmitter and the sweep expands in a linear manner so that the distance of the beam from the center X of the screen is proportional to time elapsing between the transmission of the pulse and the receipt of an echo pulse from a target. The target echoes are made to appear as bright spots T on the screen of the cathode ray tube at a distance from the center proportional to the range of the target and at a bearing which corresponds to the bearing of the target from the ship. Thus, in this type of presentation a map or plot of the area surrounding the ship is reproduced on the screen, the center X of which represents the position of the ship relative to objects in its vicinity. A cyclic sweep pattern is used to image the echoes on the screen surface which has a persistence characteristic such that the echo images continuously appear on the screen.

A predetermined time interval is provided between successive cycles of the spiral sweep during which a line or "cursor C" is produced on the surface of the screen 21.

The cursor C originates at the center X of the screen and is arranged to have an angular position with respect to a reference position corresponding to the bearing along which the echo is received as determined by the scanning receiving apparatus of the sonar system.

Target range and bearing can be determined by the means of the radial cursor C. The cursor C is positioned so as to extend from the center of the screen to the center of the point representing the target whose location is desired, and the bearing may be read from a bearing control dial 31, which is responsive to bearing control knob 32 (FIG. 1), dial 31 being calibrated in terms of angular displacement of the cursor from a reference zero which may be either true north, if true bearing is desired, or may be a plane passing fore and aft through the ship if relative bearing is desired. For determining the true bearing, means are provided to apply a signal representative of the ship's heading or course from a gyro to the relative angular displacement signal of the cursor or target in which case the calibrated dial 31 may be read directly in terms of true bearing. In the absence of such gyro signal, the calibrated dial 31 affords only a relative bearing reading.

The length of the cursor C is arranged to be proportional to range, and by the superposition of the target end of the cursor upon the target point T, the range of the target from the ship may be determined. Calibrated range indicating or range control dials 41, 41' (FIGURE 1) by means of which the range may be directly read in terms of distance, are operated in conjunction with the cursor length determining circuits, which cursor length can be increased or decreased by the rotation of a range control knob 43. Of the two range indicating dials, dial 41 extends from 0 to 15,000 yards in graduations of 1,000 yards, while dial 41' extends from 0 to 1,000 yards in graduations of 10 yards.

In order to control the excursion of the beam to produce the linear spiral sweep, a sweep S generator 130 produces a three phase signal which is applied to a Y-connected three phase deflection coil 50 on the cathode ray tube. While sweep generators capable of producing a linear spiral sweep are known in the art, a sweep generator which has been successfully employed in the preferred embodiment of the invention is more fully described in Patent No. 2,695,371, issued to H. O. Barnes on November 23, 1954 and assigned to the present assignee. In the alternative condition during the presentation of the cursor C, an array of three single phase voltages similar to a synchro order is applied to the Y-connected deflection coil 50.

The sonar system discussed in general terms hereinbefore is more fully described in the Instruction Book for Sonar Set AN/SQS–4, NAVSHIPS 92283(A), distributed by the United States Navy.

While there has been described in general outline the operating features of a conventional sonar system, an improved type of presentation, which may be entitled target center display, will now be discussed in connection with FIGURE 1B. It will be recalled that in the ship center display type of presentation (FIGURE 1A) the center X of the viewing screen represents the position of the ship, while objects in the vicinity of the ship are disposed in a map like presentation with respect thereto on the remainder of the viewing surface. In the target center display type of presentation, on the other hand, the origin O of the spiral sweep S and cursor C which is the same as that used in ship center display is displaced from the center X of the viewing screen and is positioned so that the target echo T whose range and bearing is desired is placed in the center of the screen. To accomplish the above described displacement of origin O of the sweep S and the expansion of the display, the same alternating voltages applied to the Y-connected deflection coil 50 for ship center display are amplified by a factor of two and one-half before being applied to the deflection coil 50 and an array of three direct current voltages of proper amplitude and polarity are added thereto.

Detailed description

Although a complete sonar system utilizes transmitting, receiving, keying, indicator and other miscellaneous control circuits, only the indicator circuits are of particular interest with respect to the present invention and the ensuing description will be confined thereto.

Figure 3:
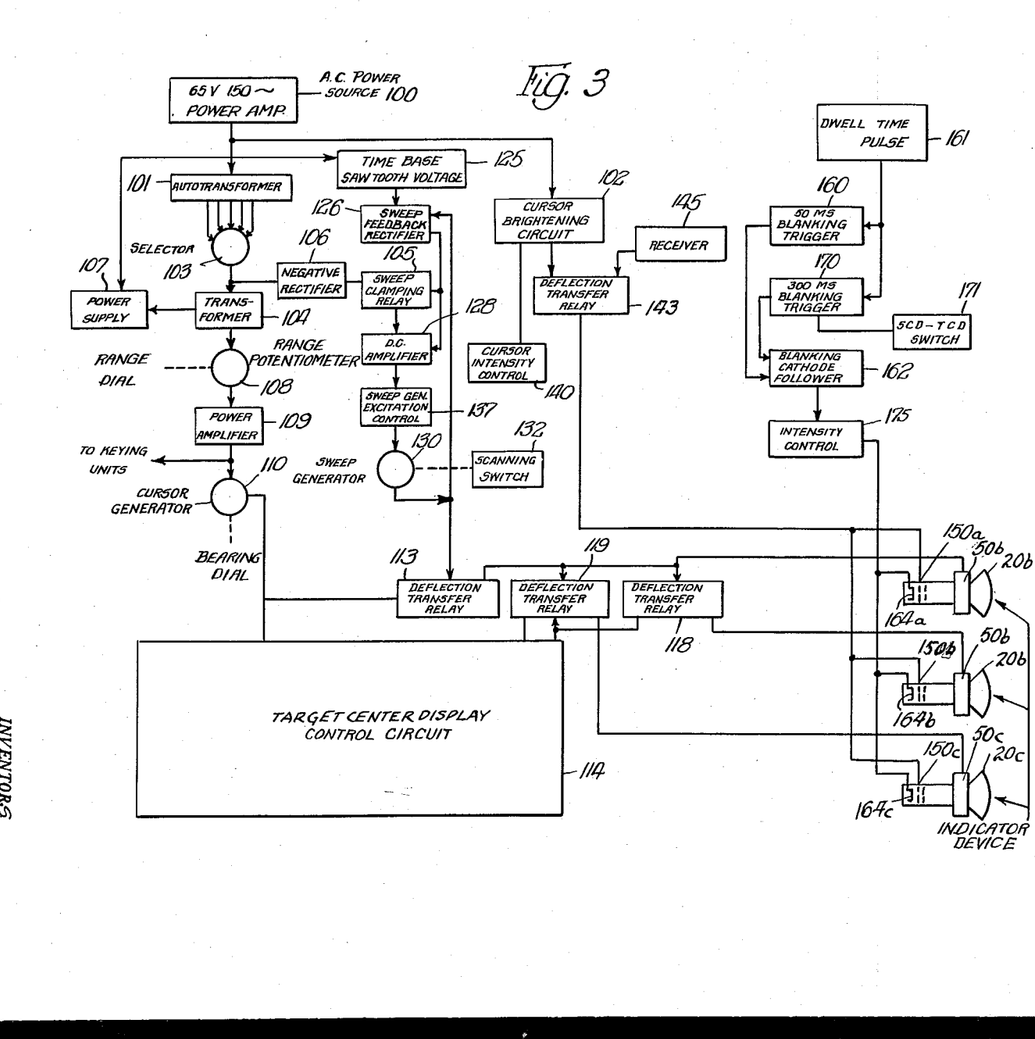
FIGURE 3 is a schematic illustration in block form of the indicator system of a sonar system constructed in accordance with the teachings of the present invention.

For a more complete understanding of the indicator circuits of the improved sonar system of the present invention reference may be had to FIGURE 3 which is a schematic diagram in block form illustrating a conventional indicator circuit including cursor generating means, spiral sweep means and echo presentation means. The target center display circuit which forms the specific subject matter of the present invention will be more fully described hereinafter. However, a full understanding of the more conventional circuitry will facilitate an explanation of the purpose and function of the target center display system.

With reference to FIGURE 3, an extremely stable power source 100, which may be of any conventional design, generates an alternating voltage signal which is applied to the input circuit of an autotransformer 101 and to the input circuit of a cursor brightening circuit 102. A six position selector switch 103 is connected to the output circuit of autotransformer 101 and selects therefrom an alternating voltage signal of predetermined amplitude depending upon the desired range scale. Selector switch 103 is used to select the appropriate full scale range of the indicator device from five different ranges available thereto. In one embodiment of the sonar system the ranges available are 1,000, 2,500, 5,000, 10,000 and 15,000 yards and from these ranges the appropriate setting for a particular target location may be selected. In addition, a listening position which presents only bearing information indicative of the angular relationship of a source of sound with respect to the listening equipment is available by a setting of selector switch 103. That is to say, substantially all targets emit sound, and the bearing of such emitted sound is determined in the same way that the bearing of an echo is determined. However, in the present discussion, no further mention will be made of the "listening" circuits of the sonar system inasmuch as they are not relevant with respect to the present invention.

The output circuit of selector switch 103 is coupled to the input circuit of a transformer 104 and to the input circuit of a sweep clamping relay 105 through a negative rectifier 106. Sweep clamping relay 105 and negative rectifier 106 are utilized to stabilize the output of the sweep generator in a manner more fully described hereinafter. Transformer 104 has two output circuits, one of which is coupled to a time base power supply circuit 107 and the other to a range potentiometer 108. The time base power supply 107 forms part of a linear time base sawtooth voltage generator more fully described in the cited NAVSHIPS publication.

Range potentiometer 108 is mechanically geared to the equipment range dials and is excited by the output signal from transformer 104. The amplitude of the output signal from range potentiometer 108 is determined by the setting of the range dials 41, 41' and the range scale selected by switch 103 and is a function of the range of the target from the ship. The output circuit of range potentiometer 108 is coupled to a range power amplifier 109 which provides a voltage proportional to range.

The output signal of the range power amplifier 109 is applied to keying circuits (not shown) which control the initiation of the transmission pulse and establish a reference time for the cycle of operation of the system. The keying circuits provide signals for the cyclic operation of the sweep and cursor presentation. The cyclic operation as controlled by the keying circuits is as follows; at zero reference time, the time base voltage starts at zero potential and increases in a positive direction linearly with time. A comparison circuit (not shown) compares the instantaneous amplitude of the linear time base voltage with the amplitude of the cursor voltage and when these amplitudes are equal, a delay pulse of predetermined duration is generated to ensure that the spiral sweep extends slightly beyond the cursor end; at the expiration of the delay pulse a dwell time pulse during which the cursor is printed begins. At the initiation of the dwell time pulse the sawtooth time base voltage is returned to zero in preparation for the next cycle. At the end of the dwell time pulse, the next cycle begins. The circuitry and operation of such keying circuits are more fully described in the previously cited publication, NAVSHIPS 92283(A).

The output signal of the range power amplifier 109 is also coupled to the input of cursor generator 110. Cursor generator 110 is a standard synchro comprising a rotor winding and three stator windings or coils spaced one hundred and twenty degrees apart around the stator and distributed in several pairs of slots. A typical synchro which may be utilized for this purpose may be found described in pages 277–288 of Principles of Radar, edited by J. Francis Reintjes and Godfrey T. Coate, third edition published in 1952 by the McGraw-Hill Book Company, Inc. The operation of the cursor generator is entirely conventional and an output signal indicative of the angular displacement of the rotor from a predetermined zero position is reflected by a change in the amount of signal induced in each of the stator coils. In addition the amplitudes of the signals from the cursor generator are determined by the amplitude of the signal from the range amplifier which it will be recalled is proportional to range. The bearing information of the received signal is introduced into the cursor generator by mechanical rotation of the rotor coil to the desired bearing while the desired range is introduced by a voltage signal from the range power amplifier 109. In FIGURE 3 we have shown three cathode ray indicating tubes 20a, 20b and 20c comparable to the tube 20 in FIGURE 1.

The output circuit of the cursor generator 110 is connected to the Y-connected deflection coils 50a of the cathode ray indicator device 20a, over contacts of deflection transfer relay 113 which operates to alternately apply the cursor generator signal C and the sweep signal S to the deflection coils 50a of the indicator device.

Additionally, the output signal from the cursor generator 110 is applied to a TCD control circuit 114 which generates a signal of appropriate amplitude and polarity to cause the end of the cursor C and thus the target T to appear at the center of the screen of the cathode ray tube. The manner of operation of the TCD control circuit 114 will be discussed in greater detail hereinafter.

If desired, the deflection coils 50b and 50c of remotely positioned indicator tubes such as 20a and 20b may be connected to the system through deflection transfer relay 113 and through their respective deflection transfer relays 118 and 119. Alternatively the TCD display type of presentation may be shown on indicator tubes 20b and 20c over the contacts of their respective deflection transfer relays 118 and 119.

At this point the cursor generation and the method of its presentation upon the viewing screen of indicator devices 20a, 20b and 20c has been discussed and the method of generation of the spiral sweep S and presentation of target information will now be adverted to.

Referring again to FIGURE 3, a time base sawtooth voltage generator 125 produces a voltage which increases linearly in proportion to the time lapse since its origination. It is imperative that the output voltage from the sweep system remains linear in the same manner as the time base sawtooth voltage in order to assure a linear spiral sweep. To insure this correlation a feedback system comprising sweep feedback rectifier 126, a sweep clamp relay 105, and a D.C. amplifier 128 are interposed between the time base sawtooth voltage generator 125 and a sweep generator 130 which converts a D.C. signal into a three phase output.

Sweep generator 130 has a rotor (not shown), the D.C. excitation to which determines the range of the deflection beam from the center of the indicator device. The rotor of sweep generator 130 is mechanically coupled to a video transducer scanner 132 which causes selection of predetermined transducer elements to scan an area around the ship in the manner of a highly directive beam at a predetermined frequency. Video transducer scanner 132 is a switch or commutator which couples in predetermined order certain of the transducer elements to individual amplifiers (not shown) and may be of the form more fully disclosed and claimed in the copending application having Serial Number 683,694, filed on July 15, 1946 by Charles H. Lanphier, entitled "Capacitive Commutator" issued on April 30, 1957 as Patent 2,790,955 and assigned to the present assignee. Hence, the frequency of the voltage produced by the sweep generator is identical with the scanning rate. The direct current excitation of the rotor of sweep generator 130 results in a three phase output at a frequency equal to the scan rate. When this output signal is applied to the deflection coils 50—50c of the indicator device, the resultant rotating field deflects the electron beam causing the spot to rotate about a magnetic center at a basic rate equivalent to that of the scanning frequency and in a constantly expanding spiral.

The output circuit of sweep generator 130 is connected to contacts of the deflection relay 113 which operates in the previously described manner to alternately present the spiral sweep signal and the cursor generator signal to the deflection coils of the cathode ray indicator devices 20a, 20b and 20c.

In order to insure a linear sweep signal from sweep generator 130, a portion of its output signal is returned to a sweep feedback rectifier 126 in which the output signal is compared with that from the time base sawtooth voltage generator 125. A difference signal resulting from the comparison of these two signals is applied to a direct current amplifier 128 which is conventional and amplifies the difference signal about thirty-five times. The amplified output signal from amplifier 128 is applied to sweep excitation control circuit 137 which supplies the direct current excitation to the rotor winding of sweep generator 130. In this manner the sweep generator output is caused to follow the time base sawtooth voltage.

It has been found that the output signal of sweep feedback rectifier 126 is independent of the phase of the output signal from sweep generator 130. If, for some reason, the output signal of the sweep generator 130 were to reverse its phase, the sweep feedback rectifier output signal would be of such polarity as to cause a regenerative condition which would prevent the sweep from originating at the center of the screen. For this reason, it becomes necessary to insure that the control voltage applied to the sweep generator 130 through the direct current amplifier 128 does not become of negative polarity. It is imperative that during the recycling interval when the voltage of time base sawtooth voltage generator 125 returns to zero, the input signal to the direct current amplifier 128 be prevented from becoming of negative polarity.

Negative rectifier 106 is coupled to the direct current amplifier 128 over contacts of the sweep clamping relay 105 to provide a signal which permits operation of the direct current amplifier 128 except during the time that the sawtooth voltage returns to zero after completion of the sweep. During the time that the sawtooth voltage is returning to zero the output of the negative rectifier is removed from the input of the direct current amplifier which is biased beyond cut-off. Simultaneously, the sweep clamp relay applies ground to the input circuit of the direct current amplifier. The direct current amplifier then produces an output signal of such voltage as to return the sweep to the center X of the indicator screen 21 in preparation for the next cycle. Unless this were done, the sweep feedback rectifier signal which is of negative polarity would allow the application of a signal of negative polarity to sweep generator 130 which would cause a 180° reversal of the sweep presented on the screen.

It will be recalled that an alternating voltage signal from power source 100 was applied to the input circuit of cursor brightening circuit 102. Cursor brightening circuit 102 comprises a diode clipper of conventional design which clips the positive half cycle of the applied alternating signal at a level set by the cursor intensity control potentiometer 140 which establishes the cut-off bias for the diode. In addition the cursor brightening circuit generates a small bright dot which occurs at the end of the cursor C to identify it positively and increase the accuracy of the superposition of the target end of the cursor C on the desired target point T.

Deflection transfer relay 143 is coupled to the output of the cursor brightening circuit 102 and to the output of a receiver 145. The receiver accepts the incoming echo pulses and in the well known manner converts them into electrical signals. The deflection transfer relay 143 is adapted to apply the cursor brightening signal to the control grids 150a, 150b and 150c of the cathode ray indicator devices 20a, 20b and 20c respectively during the application of the cursor signal from cursor generator 110. Alternatively, deflection transfer relay 143 couples the echo signals from receiver 145 to the grids of the indicator devices 20a, 20b and 20c during the sweep cycle so that they appear at the proper bearing and range.

The indicator devices 20a, 20b and 20c are blanked following each sweep presentation for a short interval to permit the beam to switch from sweep presentation S to cursor presentation C without introducing interfering traces on the screen. Following the short blanking period, the cursor C is presented on the screen and is again followed by a short blanking period to permit transfer of the beam back to its sweep cycles. The time during which the indicator devices are blanked plus the time of cursor presentation is called the dwell time and a dwell time pulse is originated in a cyclic manner immediately following the end of the sweep in the previously discussed manner.

In order to provide the proper blanking pulses at the beginning and end of the dwell time pulse a 50 ms. blanking trigger 160, which is a conventional one-shot multivibrator, is coupled to the dwell time pulse source 161. The output blanking pulses from the blanking trigger 160 are applied to a blanking cathode follower 162 which is normally cut-off. Upon receipt of the blanking pulses, cathode follower 162 conducts and generates a positive pulse which is applied to the cathodes 164a, 164b and 164c of indicator devices 20a, 20b and 20c respectively to cut-off their electron beams during the switchover time from sweep to cursor and cursor to sweep.

An additional 300 ms. blanking trigger 170 under the control of a switch 171 is provided for use with target center display presentation, as it has been found that the transients present in the deflection coils 50a—50c because of the added circuitry require a longer blanking period during the switchover between sweep display and cursor display. An intensity control device 175 is connected to the cathodes 164a, 164b and 164c of indicator devices 20a, 20b and 20c to establish the brightness of the display such that if no echo signal is received by the receiver, the indicator screens would be blank, but upon receipt of echoes, the intensity of the beam would increase sufficiently to overcome this initial condition and such echoes would be presented on the screen.

*Target center display*

Thus far there has been described a sonar system in which the display pattern is in the form of a map with the center of the indicator screen 21 being the ship's position relative to other objects or targets placed around the center X at the proper range and bearing. In accordance with the invention, means are provided to expand the sweep S and cursor length C with a consequent increase in the accuracy of range measurement and to displace the origin O of the sweep S and cursor C so as to position the target point T at the center of the screen.

Figure 4:
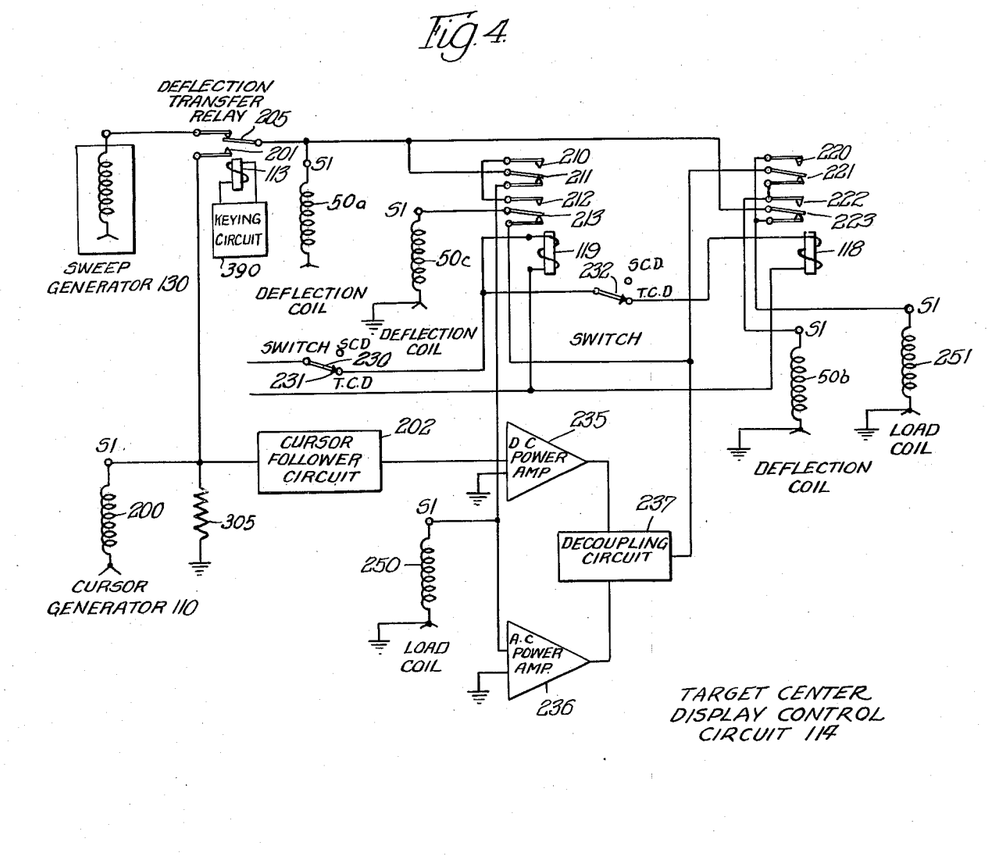
FIGURE 4 is a schematic illustration in block form of the target center display circuitry of the present invention.

Reference is made to FIGURE 4 which is a schematic representation partially in block form of a target center display control system which accomplishes these objectives. For simplicity only one leg $S_1$ of the cursor and sweep generator systems and only one leg of the deflection coil assemblies 50a—50c for each of the three indicator devices are herein illustrated. However, it should be remembered that the actual output voltage of the sweep generator is a three phase signal which is coupled to a Y-connected deflection coil assembly 50 on each of the indicator devices. The output voltage of the cursor generator is an array of three voltages in phase whose relative amplitudes differ in accordance with the relative position of the cursor generator rotor. In the illustrated embodiment it may be assumed that the amplitude of cursor generator rotor voltage is adjusted to be proportional to the range of the target and that the bearing of the target is 240° from zero reference. For convenience, the circuitry of only one leg $S_1$, is shown, as identical circuitry is utilized in conjunction with each of the other two legs of the deflection coil assembly 50.

It will be recalled that three indicator devices 20a, 20b and 20c are employed to present the sweep S and cursor display C at different locations throughout the ship. FIGURE 4 illustrates the manner in which either ship center display or target center display may be used with indicator devices 20b and 20c. The arrangement of the operating contacts of deflection transfer relays 118 and 119 is such that indicator devices 20b and 20c both may receive ship center display signals, both may receive target center display signals, or indicator device 20c may receive target center display sigals while indicator device 20b may receive ship center display signals. In any event indicator device 20a will always receive ship center display signals.

For ship center display presentation a coil 200 of cursor generator 110 which is leg $S_1$ of the three legs in its output circuit is connected to the deflection coil assembly 50a of indicator device 20a over contacts 201 of deflection transfer relay 113 and to deflection coil assembly 50c of indicator device 20c over contacts 212 and 210 of deflection transfer relay 119 and to the deflection coil assembly 50b of indicator device 116 over the contacts 222 of deflection transfer relay 118. At alternative times the output of the sweep generator 130 is connected over contacts 205 of the deflection transfer relay 113 to the deflection coil 50a of indicator device 20a and to the deflection coils 50b and 50c of indicator devices 20b and 20c respectively over the above described circuits.

For target center display, closure of switch 230 completes an operating circuit for deflection transfer relay 119. Relay 119 operates and at its contacts 213 connects the deflection coil 50c of indicator device 20c to the output of the TCD control circuits, and specifically to the output circuit of decoupling circuit 237.

Closure of switch 232 completes an energizing circuit for deflection transfer relay 118 only if switch 230 is operated to its TCD position. Relay 118 operates and at its contacts 221 connects deflection coil 50b of indicator device 20b to the output of the TCD control circuits and at its contacts 223 connects load coil 251 to the armature of deflection transfer relay 113.

The output circuits of the sweep generator 130 and the cursor generator 110 are somewhat sensitive to changes in load conditions. For this reason when the system is on TCD display and the deflection coils 50c and 50b for indicator devices 20c and 20b are coupled to the output of decoupling circuit 237, dummy load coils 250 and 251 are connected to the output of the sweep generator 130 and cursor generator 110. Thus, when relays 118 and 119 are operated they are effective at their contacts 211 and 223 respectively to connect dummy load coils 250 and 251 to the output of sweep generator 130 and alternatively to the output of cursor generator 110 over the contacts 205 and 201 respectively of deflection transfer relay 113. If relay 118 is not operated, indicator device 20b is on ship center display and its dummy load coil 251 is connected to the output circuit of the decoupling circuit 237 over contacts 220 of relay 118.

As previously indicated coil 200 is coupled to a cursor follower circuit 202 across a resistor 305 wihch establishes a ground reference. Cursor follower circuit 202 generates a direct current potential which is of an amplitude and polarity proportional to the component of cursor length, but in the opposite direction to the voltage in the $S_1$ leg of the deflection system. The direct current output of the cursor follower circuit is coupled to a direct current amplifier 235. Direct current amplifier 235 provides a power amplification of the direct current signal which shifts the point of origin of the amplified sweep or cursor when the equipment is operated in the target center display (FIGURE 1B).

The alternating current power amplifier 236 is a conventional feedback amplifier which has an overall gain of two and one-half to one and is coupled to the sweep generator 130 and the cursor generator coil 200 over contacts 211 of deflection transfer relay 119 and over contacts 205 and 201 respectively of deflection transfer relay 113 during the appropriate alternative operation thereof. Alternating current power amplifier 236 provides for an expansion of the sweep and cursor so that a more accurate range and bearing may be determined.

The output circuits of the direct current power amplifier 235 and the alternating current power amplifier 236 are combined in a decoupling circuit 237 wherein their output signals are combined to provide for an expanded sweep and cursor and for displacing the point of origin A of the sweep and cursor in such fashion that the end of the cursor and hence the target point T appear at the center X of the screen. Decoupling circuit 237 operates to prevent a direct current signal from the D.C. power amplifier from affecting the A.C. power amplifier 236 and conversely prevents any alternating current signal from the A.C. power amplifier 236 from affecting the D.C. power amplifier 235.

Figure 5:
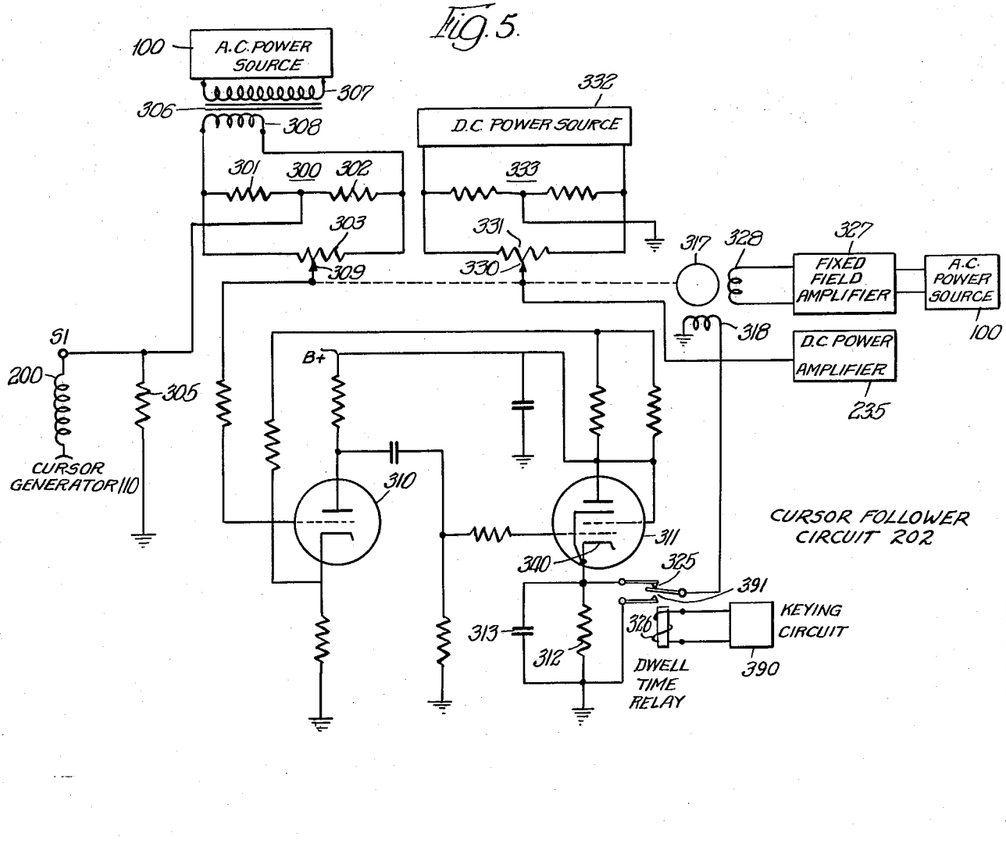
FIGURES 5–7 are schematic illustrations of certain circuits shown in block form in FIGURE 4.

The cursor follower circuit 202 shown in block form in FIGURE 4 may be more readily understood with reference to FIGURE 5 which is a schematic representation thereof. As therein shown cursor follower circuit is essentially a comparison servo. The cursor generator leg $S_1$ (coil 200) is connected to the center tap of a resistor 300 which comprises two windings 301 and 302 of equal resistance. Bridged across resistor 300 is a multiturn potentiometer 303. The output circuit of cursor generator 110 is connected to ground through a resistor 305 which establishes a ground reference for the system neutral. A transformer 306 having a primary winding 307 and a secondary winding 308 is connected between a source of alternating potential 100 and the parallel combination of resistor 300 and potentiometer 303. A variable tap 309 of potentiometer 303 is electrically connected to the input circuit of a two stage servo amplifier comprising vacuum tubes 310 and 311 coupled in conventional fashion.

A drag cup motor 317 has a winding 318 connected to the cathode 340 of tube 311 over contacts 325 of relay 326. A fixed field current is provided for motor 317 by a fixed field amplifier 327 which may be a conventional power amplifier deriving its signal from power source 100 and coupled to a field winding 328 of motor 317.

During the non-operated cycle of relay 326, the current through vacuum tube 311 flows essentially through winding 318 of motor 317, since the resistance of this winding is made small relative to cathode resistor 312. A condenser 313 is connected in parallel across winding 318 to tune out its inductance and present an essentially resistive load to tube 311.

A fixed amplitude signal is coupled from A.C. power source 100, through transformer 306 to resistor 300. A signal of an amplitude dependent upon the setting of the cursor controls is coupled from coil 200 of cursor generator 110 to the midpoint of resistor 300, between resistors 301 and 302. It is assumed, for purposes of explanation, that the setting of tap 309 of potentiometer 303 is such that, previous to the coupling of the cursor signal from coil 200, there is no unbalance at tap 309. Responsive to the coupling of the cursor signal from coil 200, an unbalance occurs across resistor 300, which unbalance signal is coupled from tap 309 to the control grid of tube 310, and this unbalance signal is amplified in tubes 310 and 311. Because the current of tube 311 also flows through the control winding 318 of servo motor 317, motor 317 is driven by the amplified unbalance signal. Servo motor 317 is arranged to drive the movable tap 309 of potentiometer 303 in such a direction as to reduce the unbalance signal. Thus, servo motor 317 continues to drive tap 309 until no unbalance signal appears at tap 309.

Servo motor 317 is additionally arranged to drive the tap 330 of potentiometer 331, which potentiometer is coupled across resistor 333 and across the D.C. power source 332. As servo motor 317 is driven by an unbalance signal to displace movable tap 309, the motor similarly displaces tap 330 of potentiometer 331. This displacement is in a direction to couple a D.C. output signal proportional in amplitude and opposite in polarity to the signal coupled from the cursor generator 110 to resistor 300. That is, if the voltage coupled from cursor generator 110 to the point intermediate resistors 301 and 302 were of such amplitude and polarity as to cause appearance of a cursor vector on the viewing screen appearing with the tail of the vector at the center of the screen and the head of the vector displaced 5 inches from the tail, the head being displaced at a bearing 240° relative to the tail of the vector, then the voltage coupled to D.C. amplifier 235 by reason of the displacement of tap 330 under the influence of servo motor 317 is of such amplitude and polarity as to cause the appearance of a cursor line on the viewing surface of the same amplitude, 5 inches, but at a bearing of 060°, with the head of the vector at the center of the viewing surface and the tail displaced at 060° relative to the head. Thus the resultant signal is of such amplitude and sense as to effect the appearance of a cursor vector having the target position determining end at the center of the viewing surface and the other end of the cursor displaced therefrom.

The cursor follower circuit 202 operates to keep the target end of the cursor at the center of the screen. The target point T will appear at the center X of the screen only if the target end of the cursor is placed on the target. If the target point T moves from the center of the screen by virtue of a change in its range or bearing, it becomes necessary to readjust the cursor C to again place its end on the target point T. To accomplish this the cursor follower circuit is disabled by connecting the ungrounded end of winding 318 of servo motor 317 to ground during the dwell time. Keying circuit 390 operates to energize relay 326 during the dwell time. Relay 326 operates and at its contacts 391 completes an obvious circuit for connecting the ungrounded end of winding 318 to ground, thus removing energizing voltage from servo motor 317.

It will be recalled that the cursor C is printed on the screen during the dwell time. The cursor length and bearing may be adjusted by varying the output voltage of leg $S_1$ of cursor generator 110 to again place the end of the cursor on the target point T. At the end of the dwell time, relay 326 restores and re-enables the cursor follower circuit. In the above described manner the cursor follower circuit generates a direct current voltage to compensate for the adjusted voltage in the output circuit of cursor generator 110 and reestablishes the origin O of the cursor C and sweep S so that the target end of the cursor and, hence the target point T appear at the center of the screen.

Figure 6:
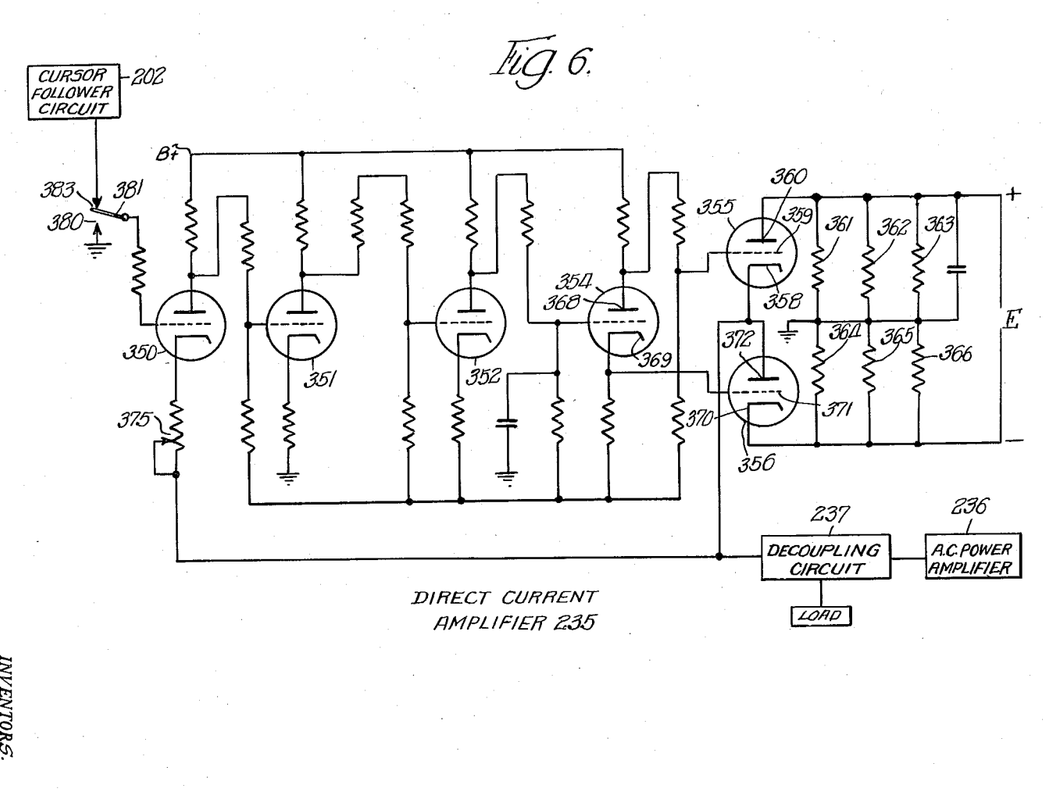

The output signal from the cursor follower circuit is connected to a direct current power amplifier 235 which will be discussed with reference to FIGURE 6 which is a schematic representation thereof comprising three stages of amplification supplied by vacuum tubes 350, 351 and 352 which may be triodes connected in the conventional manner of a direct coupled amplifier. Inasmuch as direct coupled amplifiers are conventional in the art a further detailed description of this circuitry and operation will not be discussed. The output signal from vacuum tube 352 is coupled to the input of a vacuum tube 354 which functions in a manner to provide proper driving signals to a power stage comprising vacuum tubes 355 and 356. Vacuum tube 355 may be one-half of a conventional high current duo-triode, such as a commercially available 6AS7G, having a cathode 358, a control grid 359 and an anode 360. Vacuum tube 356 may comprise the other half of a conventional 6AS7G and has a cathode 370, a control grid 371 and an anode 372. Anode 360 of tube 355 and cathode 370 of tube 356 are connected across a source of direct current potential E which is approximately center tapped to ground by a plurality of parallel connected resistors 361–363, and 364–366. The control grid 359 of tube 355 is coupled to the anode 368 of driving tube 354 and the control grid 371 of tube 356 is connected to the cathode 369 of driving tube 354.

The cathode 358 of tube 355 and anode 372 of tube 356 are connected together and to the input circuit of the direct current amplifier over a variable resistor 375 to provide a feedback circuit for stabilizing the power amplifier system. The anode 372 of tube 356 and cathode 358 of tube 355 are also connected to the deflection coils of the indicator devices through decoupling network 237 so that the magnetizing current in the deflection coils is the difference between the currents drawn by the series coupled tubes 355 and 356 and is proportional to the input voltage to the direct current amplifier.

Direct current amplifier 235 is a current amplifier whose purpose is to convert the voltage output signal of the cursor follower circuit to a current which is of sufficient value to cause the offset of the point of origin of the cursor away from the center of the indicator device screen in a direction and by an amount so that the target end of the cursor appears at its center. In the preferred embodiment magnetic deflection of the beam is used and the current in the deflection coils of the indicator devices must be of appropriate value to cause the desired offset.

The direct current amplifier 235 is not a voltage amplifier and its output voltage equals the amplitude of the input voltage signal. To calibrate the D.C. amplifier 235 it is sufficient to connect ground over contacts 380 of switch 381 to the input circuit of amplifier tube 350 and adjust the potentiometer 375 in its cathode circuit so that a zero volt output appears at the junction of cathode 358 of tube 355 and anode 372 of tube 356. If this condition is met, switch 381 is operated so that cursor follower circuit 202 is connected over its contacts 383 to the input circuit of tube 350.

Figure 7:
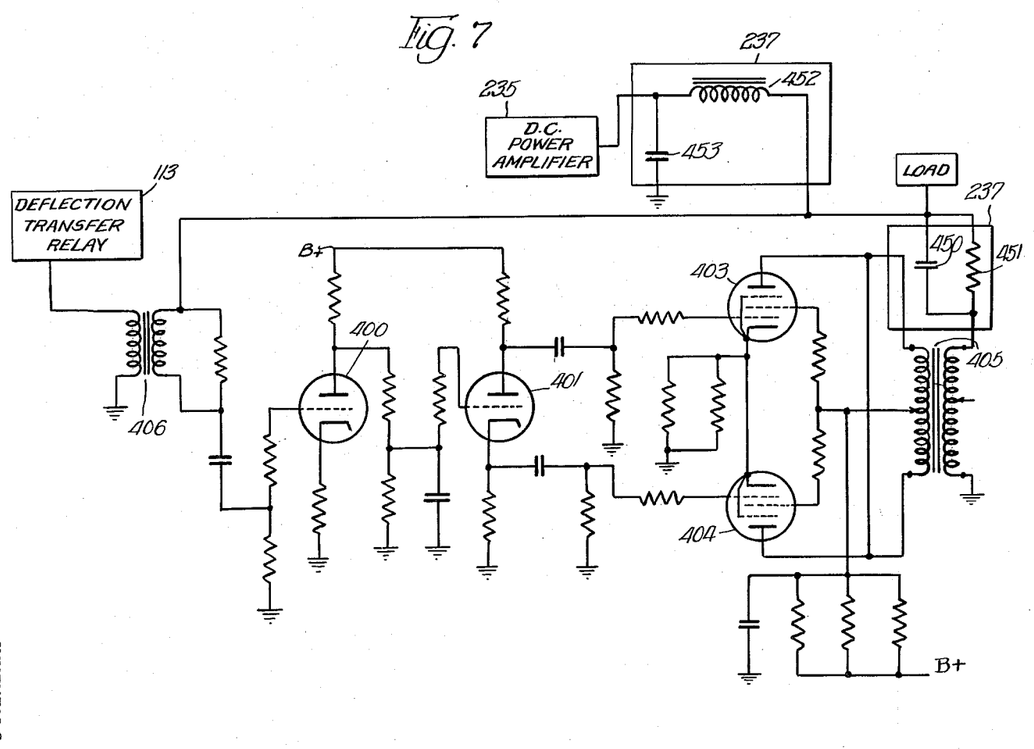

As shown in FIGURE 7, the alternating current power amplifier 236 is a conventional feedback amplifier consisting of a triode 400 connected as a voltage amplifier and a second triode 401 connected as a phase splitter. Two conventional beam power amplifier tubes 403 and 404 are connected in push pull arrangement with the output of phase splitter tube 401 and feed an output transformer 405. An input transformer 406 which has a step up ratio of 2.6 to 1 is connected to the input of amplifier tube 400 and alternately to the output of sweep generator 130 and cursor generator 110 over the contacts of deflection transfer relay 113.

A decoupling circuit 237 comprising the parallel combination of a condenser 450 and a resistor 451 in series with a coil 452 bypassed to ground by a condenser 453, is connected between the output circuits of the D.C. amplifier 235 and the A.C. amplifier 236 for the previously specified purpose.

A feedback circuit for amplifier 236 is connected between one side of the secondary of input transformer 406 and the junction of condenser 450 and coil 452 to provide a stabilizing voltage for the alternating current amplifier. The net effect of the feedback circuit is to reduce the overall gain of the A.C. amplifier to a ratio of 2.5 to 1.

In summary it is thus seen that there is provided a sonar system in which an expanded sweep S and centering of the target point T and of the cursor termination are provided to increase the accuracy of range and bearing measurements of a target. The enhanced accuracy of this system is achieved by a new and novel target center display control system comprising a direct current amplifier and an alternating current amplifier operative through a decoupling network. Means are provided to insure no change of load conditions to the sweep and cursor generators regardless of whether ship center display or target center display is used. Amplifiers are used which employ feedback circuits to stabilize their amplifying characteristics and provide an extremely accurate presentation of target center display.

While what has been shown is regarded as a preferred embodiment of the present invention, other changes, modifications and rearrangements may be made without departing from the scope of the appended claims:

We claim:

1. In an echo ranging system for determining the range and bearing of a target from a reference position, indicator means comprising a viewing surface sensitive to the impingement of an electron beam, means for generating an electron beam, means for directing said electron beam toward said viewing surface, a deflection coil assembly arranged to act on said electron beam, sweep signal generating means for producing a deflection signal operative to energize said deflection coil assembly for deflecting said electron beam to impinge on said viewing surface in a linear spiral sweep pattern having an excursion from a point of origin indicative of range, means for producing a target point indicative of target position on said viewing surface, cursor signal generating means for producing a deflection signal operative to energize said deflection coil assembly for producing a cursor reference line variable in length and angular displacement on said viewing surface, said cursor line terminating in a first point coincident with said point of origin and in a second point movable to coincide with said target point, means for alternately coupling said sweep signal generating means and said cursor signal generating means to said deflection coil assembly including means operable to superimpose said second point upon said target point and to indicate the range and bearing of said second point with respect to said first point, and displacement means for shifting said point of origin to such position that said second point of said cursor line appears at the center of said viewing surface.

2. In an echo ranging system for determining the range and bearing of a target from a reference position, indicator means comprising a viewing surface sensitive to the impingement of an electron beam, means for generating an electron beam, means for directing said electron beam toward said viewing surface, a deflection coil assembly arranged to act on said electron beam, sweep signal generating means for producing a deflection signal operative to energize said deflection coil assembly for deflecting said electron beam to impinge on said viewing surface in a linear spiral sweep having an excursion from a point of origin indicative of range, means for producing a target point indicative of target position on said viewing surface, cursor signal generating means for producing a deflection signal operative to energize said deflection coil assembly for producing a cursor reference line in a given direction variable in length and angular displacement on said viewing surface including means for producing a first voltage signal, said cursor line terminating in a first point coincident with said point of origin and a second point movable to coincide with said target point, means for alternately coupling said sweep signal generating means and said cursor signal generating means automatically to said deflection coil assembly means including range and bearing indicating means coupled to said cursor producing means operable to superimpose said second point upon said target point and to indicate the range and bearing of said second point with respect to said first point, and displacement means for shifting said point of origin to such position that said second point of said cursor line appears at the center of said viewing surface, said displacement means including means for producing a second voltage signal proportional in amplitude and opposite in direction of deflection to said first voltage signal.

3. In an echo ranging system having an indicator device including means for producing an electron beam, deflection means, sweep signal generating means for producing a deflection signal, means for coupling said deflection signal to said deflection means to effect a linear spiral sweep pattern of said electron beam, means including cursor signal producing means for producing a cursor reference line on said indicator device having a length proportional to range and having an angular displacement from a reference position indicative of bearing, means for alternately coupling said sweep signal generating means and said cursor signal producing means to said deflection means, displacement means for offsetting the origin point of said sweep pattern during each of said alternate couplings, and means for amplifying said deflection signal and said cursor signal.

4. In an echo ranging system for determining the range and bearing of a target from a reference position, indicator means comprising a viewing surface sensitive to the impingement of an electron beam, means for generating an electron beam, deflecting coil means for deflecting said electron beam relative to said viewing surface, sweep signal generating means coacting with said deflecting coil means for deflecting said beam to impinge on said viewing surface in a linear spiral sweep pattern having an excursion from a point of origin indicative of range, means for producing a target point on said viewing surface indicative of the position of said target, cursor signal generating means coacting with said deflecting coil means for deflecting said beam to produce a cursor reference line in a given direction on said viewing surface, said line having a point of origin identical with that of said sweep pattern and being variable in length and angular displacement, means for alternately coupling said sweep signal generating means and said cursor signal generating means automatically to said deflecting coil means for deflecting the electron beam means including range and bearing indicating means coupled to said cursor producing means operable to superimpose a reference point at the end of said line away from said point of origin upon said target point and to indicate the range and bearing of said reference point with respect to said point of origin, and displacement means for shifting said point of origin to such position that said reference point appears at the center of said viewing surface, said displacement means including a first amplifier means for amplifying said cursor voltage signal and of a characteristic to produce a deflection in a direction opposite to said given direction, and further including a second amplifier means for increasing both the excursion of said spiral sweep and the length of said cursor reference line to thereby increase the accuracy of the range and bearing information.

5. An echo ranging system as recited in claim 4 in which said displacement means further includes a decoupling network connected to both said first amplifier and said second amplifier means for preventing the output signals from said first amplifier means from affecting said second amplifier means, and for preventing the output signals from said second amplifier means from affecting said first amplifier means.

6. An echo ranging system as recited in claim 4 in which said first amplifier means produces an increased direct current deflection coil signal for displacing said cursor line, and said second amplifier means produces an amplified alternating current signal representative of both said spiral sweep and said cursor reference line amplified by a ratio equal to the amplification ratio of said first amplifier means.

7. In an echo ranging system, means for providing a power amplification of a direct current signal of predetermined amplitude comprising: signal developing means for producing a pair of signals, one of which signals is of the same polarity as said direct current signal and the other of which is of opposite polarity; means for applying said direct current signal to said signal developing means; a pair of electron discharge devices each having a cathode, a control grid, and an anode, the cathode of said first electron discharge device being connected to the anode of said second electron discharge device to form a junction thereat; means for applying said opposite polarity signal to the control grid of said first electron discharge device; means for applying said same polarity signal to the control grid of said second electron discharge device; a power supply for coupling a positive operating potential to the anode of said first electron discharge device, and for coupling a negative operating potential to the cathode of said second electron discharge device, said power supply being center-tapped at an intermediate point of reference potential; and means coupled to said junction and to said point of reference potential for deriving an output signal which is the difference of the currents flowing through both of said electron discharge devices and which is proportional to the amplitude of said direct current signal.

8. In an echo ranging system, an indicating device comprising means for projecting an electron beam, a single deflection coil assembly for deflecting said electron beam, sweep signal generating means operative through said single deflection coil assembly to cause said electron beam to sweep in a spiral pattern for displaying a point indicative of target position on the viewing surface of said indicating device, cursor signal generating means including range and bearing indicating means for developing a first voltage signal and utilizing same through said single deflection coil assembly in the establishment of a cursor line on said viewing surface, a second means coupled to said cursor signal generating means for developing a second voltage signal proportional in amplitude and opposite in polarity to said first voltage signal, positioning means, means for coupling said second voltage signal to said positioning means to position the reference end of said line away from the center of said viewing surface and to position the target position determining end of said line in coincidence with said target point at the center of said viewing surface, and means for alternately coupling said sweep signal generating means and said cursor signal generating means automatically to said same single deflection coil assembly.

9. An echo ranging system as recited in claim 8 in which said second means includes: a servo motor comprising a control winding, means including a balancing potentiometer coupled to said first means for producing an output signal indicative of the amplitude of said first voltage signal, a servo amplifier coupled to said balancing potentiometer, means for developing a control signal, means for applying said control signal to said control winding to energize said servo motor, and a balancing bridge having a potentiometer connected to said servo motor for developing an output direct current signal of an amplitude proportional to said first voltage signal and opposite in polarity thereto.

10. In an echo ranging system for determining the location of a target comprising an indicating device having means for projecting an electron beam, a single deflection coil assembly for deflecting said electron beam, sweep signal generating means operative through said single deflection coil assembly to cause said electron beam to sweep in a spiral pattern for displaying a target point indicative of the position of said target on the viewing surface of said indicating device, cursor signal generating means having a first means including range and bearing indicating means for developing a first voltage signal and utilizing said signal in the establishment of a cursor reference line in a given direction on said viewing surface, said line extending from a point of origin to said target point, a second means coupled to said first means for developing a second voltage signal proportional in amplitude and opposite in direction of deflection to said first voltage signal, power amplifier means coupled to said second means for amplifying said second voltage signal to produce an increased power signal, means for applying said increased power signal to said indicating device for offsetting the point or origin of said line away from the center of said viewing surface, for proportionally increasing the length of said line, and for positioning the target position indicating end of said line at the center of said viewing surface, and means for alternately coupling said sweep signal generating means and said cursor signal generating means automatically to said same single deflection coil assembly.

11. An echo ranging system as recited in claim 10 in which said power amplifier means includes a driver stage, means for applying said second voltage signal to said driver stage, means for deriving from said driver stage a first signal voltage which is a positive replica of said applied voltage and for deriving a second signal voltage which is an inverted replica of said applied voltage, a pair of electron discharge devices each comprising an anode, a cathode, and a control electrode, said electron discharge devices having separate input circuits and having the cathode of one device coupled to the anode of the other of said devices to form a common output circuit, means for applying said positive replica signal to the input circuit of one of said devices and means for applying said inverted replica signal to the input circuit of the other of said devices, and means for deriving an output signal from the common output circuit of said electron discharge devices such that said output signal is the difference in current flow between said devices, whereby the target indicating end of said cursor reference line is positioned substantially at the center of said viewing surface.

12. In an echo ranging system for determining the range and bearing of a target from a reference position, indicator means comprising a viewing surface sensitive to the impingement of an electron beam, means for generating an electron beam, means including deflection means for directing said electron beam to strike said surface, means including a sweep generator and said deflection means for moving said electron beam in a linear spiral sweep having an excursion from a point of origin indicative of range, displacement means for shifting said origin point from said center of said viewing surface, dummy load coil means electrically simulating said deflection means, and switching means for at times coupling said sweep generator to said deflection means, and for at other times coupling said sweep generator to said dummy load coil means and for coupling said displacement means to said deflection means.

13. In an echo ranging system for determining the location of a target by displaying a target point indicative of the position of said target on the viewing screen of an indicating device: a first means including range and bearing indicating means for producing a first voltage signal and deflecting means responsive thereto for establishing a cursor line on said screen; means for adjusting the position of said cursor line to effect coincidence of the target position indicating end of said line with said target point; a second means coupled to said first means for developing a second voltage signal proportional in amplitude and inverse in polarity to said first voltage signal and utilizing same in positioning the origin of said line away from the center of said screen and for positioning the target position indicating end of said line at the center of said screen; and switch means coupled to said second means for at times disabling said second means for a time during which said cursor line may be adjusted.

14. A signal generator for developing a signal for offsetting the origin of a cursor line in an echo ranging system comprising a first balancing bridge having a pair of input circuits and an output circuit, means coupled to one of said input circuits for applying thereto a signal of fixed amplitude, means coupled to the other of said input circuits for applying thereto a signal of a second fixed amplitude, said first balancing bridge comprising a movable tap connected with one of said circuits, output means coupled to said output circuit for deriving an unbalance signal indicative of the unbalanced state of said bridge, amplifier means coupled to said output means for developing a control signal proportional to said unbalance signal, a servo motor having a control winding coupled to said amplifier means for driving, by means of said servo motor, the movable tap of said bridge in such a direction as to compensate for said unbalance, and a second bridge connected to a source of direct current and having a balancing element connected to said servo motor and movable responsive to movement of said servo motor to develop a direct current signal proportional in amplitude and opposite in polarity to said second fixed amplitude signal.

15. In an echo ranging system, an indicating device, means for displaying a point indicative of target position on the viewing surface of said indicating device, a first means including range and bearing indicating means for developing a first voltage signal and utilizing same in the establishment of a line on said viewing surface, a second means coupled to said first means for developing a second voltage signal proportional in amplitude and opposite in polarity to said first voltage signal, positioning means, means for coupling said second voltage signal to said positioning means to position the reference end of said line away from the center of said viewing surface and to position the target position determining end of said line in coincidence with said target point at the center of said viewing surface, said second means including a servo motor comprising a control winding, means including a balancing potentiometer coupled to said first means for producing an output signal indicative of the amplitude of said first voltage signal, a servo amplifier coupled to said balancing potentiometer, means for developing a control signal, means for applying said control signal to said control winding to energize said servo motor, and a balancing bridge having a potentiometer connected to said servo motor for developing an output direct current signal of an amplitude proportional to said first voltage signal and opposite in polarity thereto.

References Cited in the file of this patent

UNITED STATES PATENTS

| | | |
|---|---|---|
| 2,421,312 | Bobb | May 27, 1947 |
| 2,426,217 | Hoisington | Aug. 26, 1947 |
| 2,502,428 | Cleaver | Apr. 4, 1950 |
| 2,598,236 | Dickey | May 27, 1952 |
| 2,697,882 | Schuck | Dec. 21, 1954 |
| 2,717,330 | Meagher | Sept. 6, 1955 |
| 2,720,645 | Sherwin | Oct. 11, 1955 |
| 2,724,050 | Boscia | Nov. 15, 1955 |
| 2,727,229 | Anast | Dec. 13, 1955 |
| 2,783,314 | Reeves | Feb. 26, 1957 |
| 2,802,907 | Peterson | Aug. 13, 1957 |
| 2,812,481 | Roosdorp | Nov. 5, 1957 |